United States Patent [19]

Miyata

[11] 4,379,882
[45] Apr. 12, 1983

[54] HALOGEN-CONTAINING POLYOLEFIN COMPOSITION, AND METHOD FOR INACTIVATING HALOGENS THEREIN

[75] Inventor: Shigeo Miyata, Takamatsu, Japan

[73] Assignee: Kyowa Chemical Industry Co., Ltd., Tokyo, Japan

[21] Appl. No.: 320,116

[22] Filed: Nov. 10, 1981

[30] Foreign Application Priority Data

Nov. 12, 1980 [JP] Japan .................. 55-158152

[51] Int. Cl.³ ................... C08K 3/20; C08F 6/00
[52] U.S. Cl. ................... 524/436; 524/394; 524/437; 524/576; 524/584; 524/586; 528/485; 528/489
[58] Field of Search .............. 524/436, 437, 394, 586, 524/584, 576; 528/485, 489

[56] References Cited

U.S. PATENT DOCUMENTS

| | | | |
|---|---|---|---|
| 4,098,762 | 7/1978 | Miyata et al. | 524/436 |
| 4,145,404 | 3/1979 | Miyata et al. | 423/635 |
| 4,154,718 | 5/1979 | Miyata et al. | 423/430 |
| 4,284,762 | 8/1981 | Miyata et al. | 528/485 |
| 4,299,759 | 11/1981 | Miyata et al. | 524/436 |

OTHER PUBLICATIONS

Chemical Abstracts, vol. 85, No. 8, Aug. 23, 1976, entry 51742f.

*Primary Examiner*—Ronald W. Griffin
*Attorney, Agent, or Firm*—Wenderoth, Lind & Ponack

[57] ABSTRACT

A polyolefin composition consisting essentially of
(a) 100 parts by weight of a polyolefin containing halogens derived from a polymerization catalyst and/or attributed to the after-halogenation of the polymer, and
(b) about 0.001 to about 10 parts by weight of an aluminum-magnesium hydroxide represented by the following formula $$Mg_{1-x}Al_x(OH)_{2+x} \cdot mH_2O \qquad (1)$$

wherein x is a positive number represented by $0 < x \leq 0.5$ and m is a positive number represented by $0 \leq m < 2$, and having a BET specific surface area of no more than about 40 m²/g; and a method for inactivating the halogen in a halogen-containing polyolefin.

6 Claims, No Drawings

HALOGEN-CONTAINING POLYOLEFIN COMPOSITION, AND METHOD FOR INACTIVATING HALOGENS THEREIN

This invention relates to a halogen-containing polyolefin composition having a reduced tendency to corrode molding machines or to degrade molded articles prepared therefrom, as well as improved heat resistance and weatherability, and to a method for inactivating halogens therein.

It is known that polyolefins (which embrace both homopolymers and copolymers) containing halogens derived from polymerization catalysts and/or attributed to the after-halogenation of the polymers, such as olefin polymers or copolymers produced by using Ziegler-type catalysts comprising a halogen-containing compound as a catalyst component and/or a carrier component, or the after-halogenated products of these polymers, frequently corrode metallic parts of molding machines during their molding operation, or color or degrade the resulting molded articles, because of the halogens contained therein. The polyolefin composition of this invention is free from the trouble of corrosion, degradation or coloration which is due to the presence of halogens.

More specifically, this invention pertains to a polyolefin composition consisting essentially of
(a) 100 parts by weight of a polyolefin containing halogens derived from a polymerization catalyst and/or attributed to the after-halogenation of the polymer, and
(b) about 0.001 to about 10 parts by weight of an aluminum-magnesium hydroxide of the following formula $$Mg_{1-x}Al_x(OH)_{2+x} \cdot mH_2O \tag{1}$$

wherein x is a positive number represented by $0 < x \leq 0.5$, and m is a positive number represented by $0 \leq m < 2$.

The invention also pertains to a method for stabilizing halogens in the aforesaid halogen-containing polyolefin which comprises mixing said components (a) and (b).

Polyolefins obtained by using Ziegler catalysts contain varying amounts of a halogen-containing catalyst residue derived from a catalyst component and/or a carrier component. Even when there are used highly active Ziegler catalysts and other highly active catalysts comprising a titanium catalyst component containing titanium, magnesium and halogen, which have come into commercial acceptance in recent years, the resulting polyolefins contain at least several hundred ppm of halogens as a catalyst residue. As a matter of course, polyolefins produced by using conventional Ziegler catalysts contain larger amounts of halogens as catalyst residues because their activity is inferior to the aforesaid highly active catalysts. Hence, a complex and disadvantageous operation is necessary for removing the catalyst residues. For example, it is necessary to subject a polymerization product obtained in a polymerization vessel which contains the polymer, solvent, catalyst and unreacted monomer to a series of complex treatments in a degassing tank, a decomposition tank, a neutralization tank, a first centrifugal separator, an emulsification tank, a stripper tank, a second centrifugal separator and finally a dryer. The polyolefin which has undergone these treatments still contains an amount of halogens which may cause troubles in subsequent treating operations.

When such halogens in the catalyst residues are left untreated in the polyolefins, they will corrode extruders, molding machines, etc., reduce the weatherability and heat resistance of the polyolefins, or degrade or color molded articles prepared therefrom.

In an attempt to improve the surface properties of polyolefins, there was proposed a resin composition consisting of 100 parts by weight of a polyolefin and 0.5 to 300 parts by weight, preferably 20 to 60 parts by weight, of a metal hydroxide represented by a general formula which can encompass hydrotalcites (Japanese Patent Publication No. 39487/1977). This patent publication is quite silent about the technical problem of corrosion or coloration of polyolefins containing halogens derived from polymerization catalysts and/or attributed to after-halogenation, or any solution to this technical problem. It states that the amount of the metal hydroxide used to improve the surface properties of the polyolefins should be at least 20 parts by weight per 100 parts by weight of the polyolefin. Moreover, the patent document has no specific disclosure about the BET specific surface area of the hydrotalcites used.

Japanese Laid-Open Patent Publication No. 90192/1977 teaches that in order to improve the fire retardancy of thermoplastic resins including polyolefins, the use of hydrotalcites having a BET specific surface area of not more than 30 m²/g is useful, and also discloses a fire retardant for thermoplastic resins which comprises such a hydrotalcite. This patent document discloses that a fire retarding effect can be obtained when the hydrotalcite fire retardant is used in an amount of about 50 to about 150 parts by weight per 100 parts by weight of the thermoplastic resin. This patent document is also silent about the technical problem of corrosion or coloration of polyolefins containing halogens derived from polymerization catalysts and/or attributed to after-halogenation, or any solution to this technical problem.

There is also known a polyolefin composition consisting of a polyolefin produced by using a Ziegler catalyst and at least 0.01% by weight, preferably 0.1 to 1.0% by weight, of a compound of the following general formula (which may encompass hydrotalcites)

$$M_xAl_y(OH)_{2x+3y-2z}(A)_z \cdot aH_2O$$

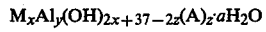

wherein M represents Mg, Ca or Zn, A represents $CO_3$ or $HPO_4$, and x, y, z and a are positive numbers, which is for the purpose of improving the corroding tendency and yellowing resistance of polyolefins, especially those produced by using Ziegler catalysts (Japanese Laid-Open Patent Publication No. 49258/1977). This Japanese patent document states that a prior art technique of preventing the corroding tendency of a polyolefin containing a halogen-containing catalyst residue by incorporating a basic compound, e.g. an oxide or hydroxide, of an alkaline earth metal (Japanese patent publication No. 3541/1958), and a prior art technique of using alumina or aluminum hydroxide (Japanese Laid-Open Patent Publication No. 3947/1974), are useful for preventing corroding tendency but give rise to a new problem of the yellowing of polyolefins, and that the use of a fatty acid salt of an alkaline earth metal, such as calcium stearate, if used in an amount sufficient to produce an anticorrosive effect, will impair the properties of the polyolefins. The Japanese Laid-Open Patent Publication No. 49258/1977 states that the use of a small amount of the above compound can produce an anticorrosive effect, and even when it is used in polyolefins containing phenolic stabililizers yellowing of polyolefins does not occur.

This patent document, however, does not at all state what hydrotalcites should be used to obtain an excellent inhibitory effect on the aforesaid problem of corrosion, degradation and coloration. It does not state that for achieving this inhibitory effect, there are many technical problems to be solved, for example the poor reproducibility of the above inhibitory effect under the influences of such factors as the particle size and agglomerating tendency of the crystals, the poor dispersion of the hydrotalcites in polyolefins, the reduced flowability of polyolefins during molding owing to the incorporation of the hydrotalcites, and the reduced appearance of molded articles of polyolefins owing to the incorporation of the hydrotalcites. Nor does it disclose anything which indicates what hydrotalcites should be used in order to solve these technical problems.

Hydrotalcites which are usually available have a BET specific surface area of at least about 50 m²/g, an average second-order particle diameter of at least about 10 microns, and a crystal particle diameter in the <003> direction of not more than about 300 Å. Even when they serve to improve the corroding tendency and yellowing resistance of polyolefins, they have serious defects which limit their practical use. For example, they have poor dispersibility in resins, and the resulting composition cannot be formed into fibers. Or resins containing such hydrotalcites give films having "fish eyes" which make their appearance and transparency unsuitable for practical applications.

In order to solve these technical problems, the present inventors previously proposed the use of a hydrotalcite having a BET specific surface area of not more than 30 m²/g and preferably an average second-order particle diameter of not more than 5 microns and a crystalline particle diameter in the <003> direction of at least 600 Å, represented by the following formula

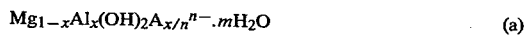

$Mg_{1-x}Al_x(OH)_2A_{x/n}{}^{n-} \cdot mH_2O$     (a)

wherein x is a number represented by 0 < x23 0.5 (preferably 0.2 ≦ x ≦ 0.4), $A^{n-}$ represents an anion having a valence of n, preferably $CO_3{}^{2-}$ or $SO_4{}^{2-}$, and m is a positive number, (Japanese Laid-Open Patent Publication No. 80447/1980).

On further investigation, the present inventors have found that the activity of the hydrotalcites to neutralize or capture halogens depends upon their anion exchangeability, and that for example, in the above formula (a) the anion $A^{n-}$ mainly exhibits anion exchangeability, and this anion performs ion exchange with the halogen. It has also been found that although OH in formula (a) participates in the reaction with the halogen, the reactivity of OH is similar to that of OH in $Ca(OH)_2$ or $Mg(OH)_2$, and that in $Ca(OH)_2$ or $Mg(OH)_2$ only those OH groups which are near the surface of the crystals mainly participate in the reaction, and the OH groups in the interior of the crystals which are present in a major proportion are hindered by Ca or Mg halides formed on the surface of the crystals and scarcely participate in the reaction.

Further investigations have led to the unexpected discovery that the anion exchange of the hydrotalcites tends to extend to the interior of the crystals, and when the anion $A^{n-}$ is a monovalent anion, it is most easily exchanged with a halogen ion, and that a hydroxyl ion as the monovalent anion is most suitable for inactivating the halogen ion.

It has also been found that an aluminum-magnesium hydroxide of the following formula

$Mg_{1-x}Al_x(OH)_{2+x} \cdot mH_2O$     (1)

wherein x and m are as defined hereinabove, which has a similar crystal structure to hydrotalcite and a BET specific surface area of not more than about 40 m²/g, preferably not more than about 30 m²/g, exhibits much superior halogen-inactivating ability than the hydrotalcites in the prior art techniques, inhibits the corroding tendency, degradation or coloration of halogen-containing polyolefins containing halogens derived from polymerization catalysts and/or attributed to after-halogenation, improves their heat stability and weatherability, and has good dispersibility in polyolefins to provide polyolefin compositions having satisfactory moldability which are capable of giving molded articles, such as fibers and films, having improved appearance and transparency.

It has also been found that the aluminum-magnesium hydroxide of formula (1) can be used in a wider range of applications because it can be formed into fine powders more readily than the conventional hydrotalcites, and has a greater capacity for neutralizing or inactivating the halogens, thus making it possible to inactivate larger amounts of halogens even when used in reduced amounts which are not likely to affect adversely the properties of the halogen-containing polyolefins. It has also been found that the use of the compound of formula (1) can afford polyolefin compositions which are advantageously free from various troubles, such as filament breakage during fiber formation, the occurrence of a haze during film formation, or the deteriorated appearance of molded articles prepared therefrom.

It is an object of this invention therefore to provide a polyolefin composition which can avoid the troubles of the corroding tendency, degradation or coloration of polyolefins containing halogens derived from polymerization catalysts and/or attributed to the after-halogenation of the polymers, and improve their heat resistance or weatherability, and which further exhibits improvements in moldability, appearance and transparency.

The above and other objects and advantages of this invention will become more apparent from the following description.

The aluminum-magnesium hydroxide of formula (1) used in this invention is known per se, and a process for its production is disclosed, for example, in Japanese Patent Publication No. 6040/1976.

Specifically, there are used in this invention aluminum-magnesium compound hydroxides of the formula

$Mg_{1-x}Al_x(OH)_{2+x} \cdot mH_2O$     (1)

wherein x is a positive number represented by 0 < x ≦ 0.5, preferably 0.2 ≦ x ≦ 0.4, and m is a positive number represented by 0 ≦ m < 2, which has a BET specific surface area of not more than about 40 m²/g, preferably not more than about 30 m²/g, especially preferably not more than about 20 m²/g. Preferably, these hydroxides have an average second-order particle diameter of not more than about 5 microns, especially not more than about 1 micron.

The crystalline particles of the aluminum-magnesium compound hydroxide utilized in this invention are fully grown, and have low strain. Furthermore, since they have much reduced agglomerating tendency, they do not form coarse agglomerates nor have poor dispersibility. In addition, it shows a high capacity for inactivating halogens.

X-ray diffraction data of an example [x=0.3 in formula (1)] of the above aluminum-magnesium hydroxide are shown in Table 1 below.

TABLE 1

X-ray diffraction data of
$Mg_{1-x}Al_x(OH)_{2+x} \cdot mH_2O$ (x = 0.30)

| Interplanar spacing (d, Å) | Relative intensity | hkl |
|---|---|---|
| 7.62 | 100 | 003 |
| 3.83 | 29 | 006 |
| 2.576 | 8 | 102, 009 |
| 2.378 | 4 | 104 |
| 2.296 | 5 | 105 |
| 2.013 | 4 | 107 |
| 1.947 | 5 | 108 |
| 1.527 | 5 | 110 |
| 1.496 | 5 | 113 |

The aluminum-magnesium hydroxide of formula (1) used in this invention can be formed, for example, by reacting (i) an aqueous solution of a water-soluble aluminum salt such as an alkali metal aluminum salt, an aluminum halide or aluminum nitrate with (ii) an aqueous solution of a water-soluble magnesium salt such as a magnesium halide or magnesium nitrate at a pH of at least about 12; or by performing the above reaction at a pH of at least about 8 and then reacting the product with an alkali such as an alkali metal hydroxide to perform ion exchange with an OH anion.

The above reaction and the ion exchange can be carried out at room temperature. If desired, elevated temperatures, for example about 10° to about 100° C. may be employed.

Usually, the aluminum-magnesium hydroxides so obtained have a BET specific surface area of at least about 100 m²/g and an average second-order particle diameter on the order of several tens of microns. For utilization in this invention, it may be washed with water and then hydrothermally treated in an aqueous medium at a temperature of about 120° to about 250° C. under pressure for a period of about 1 to about 40 hours to adjust its BET specific surface area to not more than about 40 m²/g, and its average second-order particle diameter to not more than about 5 microns. The hydrothermal treatment can be carried out, for example, in an autoclave under an elevated pressure of, say, about 2 to about 50 kg/cm².

The aluminum-magnesium hydroxide used in this invention may be surface-treated with an alkali metal salt of a higher fatty acid. This is preferred because it serves to increase dispersibility further. Preferably, the surface treatment is carried out by using about 1 to about 10 parts by weight of the alkali metal salt of a higher fatty acid per 100 parts by weight of the compound hydroxide.

The above surface-treatment can be carried out, for example, by dissolving the aforesaid amount of an alkali metal stearate or oleate such as sodium stearate or sodium oleate in warm water, and adding a powder or a suspension of the aforesaid hydroxide of formula (1) to allow adsorption reaction to take place for about 30 to about 60 minutes, preferably with thorough stirring. In this manner, the surface (positively charged) of the crystals of the hydroxide of formula (1) can be coated by the chemical adsorbing action of an anion of the higher fatty acid which is negatively charged. Thereafter, as required, the surface-coated product may be washed, dehydrated and dried. This surface treatment serves to prevent re-agglomeration of the hydroxide of formula (1) and increase its compatibility with the resin. Consequently, the dispersibility of the Mg-Al hydroxide and the heat flowability of a polyolefin composition containing the Mg-Al hydroxide during molding can be further improved.

The hydroxide of formula (1) in accordance with this invention may be added to any polyolefins which contain halogens derived from polymerization catalysts and/or attributed to after-halogenation. Examples include polymers and copolymers of $C_2$–$C_8$ olefins, copolymers of at least one $C_2$–$C_8$ olefin with a diene, polymers or copolymers of $C_4$–$C_8$ dienes, and the after-halogenated products of these polymers or copolymers. The halogens are, for example, chlorine and bromine.

More specific examples of these polyolefins are polymers or copolymers of olefins such as polyethylene, polypropylene, poly-1-butene, poly-4-methyl-1-pentene, and ethylene/propylene copolymer, an ethylene/1-butene copolymer, polyisoprene rubber, polybutadiene rubber, an ethylene/propylene/diene rubber or the like; copolymers of at least one of the olefins mentioned with dienes; after-chlorinated products of these polymers or copolymers; and blends of these halogen-containing polyolefins.

The composition of this invention contains 100 parts of the halogen-containing polyolefin and a halogen-inactivating agent comprising as an active ingredient about 0.001 to about 10 parts by weight, preferably about 0.001 to about 5 parts by weight, more preferably about 0.01 to about 1 part by weight, especially preferably about 0.05 to about 0.5 part by weight, of the aluminum-magnesium compound hydroxide of formula (1) which has a BET specific surface area of not more than about 40 m²/g.

The composition of this invention can be prepared by blending the aforesaid halogen-inactivating agent with the polyolefin. For this purpose, any means of blending which ensures uniform mixing, for example conventional means for incorporating stabilizers, fillers, etc. into resins, can be used in this invention. This can be achieved, for example, by means of a ribbon blender, a high-speed mixer, a Ko-kneader, a pelletizer, a mixing roll, an extruder or an intensive mixer.

In practicing the present invention, conventional additives for polyolefins may be incorporated in addition to the specified aluminum-magnesium hydroxide (1). Examples of such additives are anti-oxidants such as 2,6-di-t-butyl-p-cresol, 2,5di-t-butylhydroquinone, 2,2'-methylenebis(4-methyl-6-t-butylphenol), 4,4'-thiobis(6-t-butylphenol), 4,4'-thiobis(6-t-butyl-m-cresol), and octadecyl-3-(3',5'-di-t-butyl-4'-hydroxyphenyl) propionate; ultraviolet absorbers antistatic agents such as pentaerythritol monostearate, sorbitan monopalminate, sulfonated oleic acid, polyethylene oxide and carbowax; lubricants such as calcium stearate, zinc stearate, butyl stearate and ethylenebis-stearamide; plasticizers such as dimethyl phthalate, diethyl phthalate, oleic acid esters, phosphoric acid esters, waxes, and liquid paraffin; coloring agents such as carbon black, phthalocyanine, quinacridone, indoline, azo pigments, titanium dioxide and red iron oxide; and fillers such as asbestos, glass fibers, talc, mica, ballastonite, calcium silicate, aluminum silicate, calcium carbonate, magnesium hydroxide, and magnesium oxide.

The amounts of these additives can be suitably selected. For example, based on the weight of the halogen-containing polyolefin, there may be used about 0.01 to about 1.0% of the antioxidants, about 0.01 to about 1.0% of the ultraviolet absorbers, about 0.01 to about 1% of the antistatic agents, about 0.1 to about 5% of the lubricants, about 0.1 to about 10% of the plasticizers, about 0.1 to about 5% of the coloring agents, and about 1 to about 50% of the fillers.

The following Examples illustrate the present invention more specifically.

In these examples, a corrosion test and a yellowing test were performed by the following methods.

Corrosion test

A well-polished and degreased mild steel panel, 40×40 cm in size, was embedded in a resin composition prepared by kneading the following ingredients at 220° C. and pelletizing the mixture.

| | |
|---|---|
| Halogen-containing polyolefin | 100 parts by weight |
| Halogen neutralizing agent | 0.05–0.3 parts by weight |
| 2,2'-methylenebis-(4-methyl-6-t-butylphenol) | 0.1 parts by weight |
| Dilauryl thiodipropionate | 0.1 parts by weight |

The entire system was heated at 230° C. for 4 hours, and then allowed to cool. The mild steel panel was pulled out from the sample, and put in a desiccator adjusted to a relative humidity of about 98%, and left to stand at 60° C. for 3 days. Then, the degree of rust formation of the mild steel panel was rated on a scale of class 1 to class 10, in which class 1 shows no change and class 10 shows that rust formed almost over the entire surface. More specifically, the results were evaluated on the following standards. Class 4 to class 1 mean practical corrosion resistance. Classes 3 to 1 are preferred.

| Class | The percentage of the area where rust occurred, based on the total area of the mild steel panel |
|---|---|
| 1 | No formation of rust |
| 2 | less than 1% |
| 3 | 1% to less than 5% |
| 4 | 5% to less than 10% |
| 5 | 10% to less than 20% |
| 6 | 20% to less than 30% |
| 7 | 30% to less than 50% |
| 8 | 50% to less than 70% |
| 9 | 70% to less than 90% |
| 10 | Rust occurred almost over the entire surface |

Yellowing test

The aforesaid pellets were molded at 230° C. into a sheet having a thickness of 1 mm. A sample having a size of 30×30×1 mm was cut out from the sheet. The sample sheet was then heated at 150° C. for 20 days, and the degree of yellowing (b), defined by the following formula, was measured by a photoelectric color difference meter.

The degree of yellowing (b) was calculated in accordance with the following equation:

$$b = \frac{70(Y - 0.8472)}{Y^{\frac{1}{2}}}$$

wherein Y is one of the tristimulus values X, Y and Z. Larger b values show greater degrees of yellowing.

Appearance of molded articles

The pellets shown above were molded into a film having a thickness of 20 microns, and the appearance of the film was observed visually.

EXAMPLES 1 TO 4 AND COMPARATIVE EXAMPLES 1 TO 3

Each of the inactivating agents shown in Table 2 was blended with polypropylene (having the Cl content of 300 ppm) obtained by using a highly active Ziegler catalyst having magnesium chloride as a carrier without performing a deashing treatment. The mixture was pelletized at 230° using an extruder. The pellets were molded into a film having a thickness of about 20 microns by means of an extrusion molding machine at about 250° C. All of the inactivating agents had been surface-treated with 4 parts by weight of sodium stearate by dissolving 40 g of sodium stearate in about 20 liters of warm water at about 80° C., and with stirring, adding 1 kg of each of the inactivating agents in powder form, continuing the stirring for about 30 minutes, and then filtering and drying the product.

EXAMPLE 5

One kilogram of the inactivating agent shown in Table 2 was added to about 20 liters of warm water at about 60° C. containing 30 g of sodium oleate dissolved therein. The mixture was stirred for about 30 minutes, filtered and dried. The treated inactivating agent was added to high-density polyethylene having a Cl content of 100 ppm which was produced by using a highly active Ziegler catalyst having magnesium chloride as a carrier without performing a deashing treatment, in the mixing ratio shown in Table 2. The mixture was pelletized at 250° C. by means of an extruder. The pellets were molded at 260° C. into a film having a thickness of 20 microns.

EXAMPLE 6

The inactivating agent shown in Table 2 was blended with polyisobutylene (having a Cl content of 800 ppm) produced by using a Ziegler catalyst. The mixture was extruded and pelletized at about 200° C. by means of an extruder.

The results obtained in Examples 1 to 6 and Comparative Examples 1 to 3 are shown in Table 2.

TABLE 2

| Example (Ex.) or Comparative Example (CEx.) | Type of the halogen-inactivating agent | Specific surface area, BET (m²/g) | Average second-order particle diameter (μ) | Amount of the halogen-inactivating agent (wt %) |
|---|---|---|---|---|

TABLE 2-continued

| Ex. | | | | | |
|---|---|---|---|---|---|
| Ex. 1 | $Mg_{0.7}Al_{0.3}(OH)_{2.3} \cdot 0.7H_2O$ | 24 | less than 0.1 | 0.2 | |
| Ex. 2 | $Mg_{0.8}Al_{0.2}(OH)_{2.2} \cdot 0.8H_2O$ | 36 | 0.8 | 0.2 | |
| Ex. 3 | $Mg_{0.6}Al_{0.4}(OH)_{2.4} \cdot 0.6H_2O$ | 28 | 0.3 | 0.2 | |
| Ex. 4 | $Mg_{0.74}Al_{0.26}(OH)_{2.26} \cdot 0.72H_2O$ | 28 | less than 0.1 | 0.2 | |
| CEx. 1 | Calcium stearate | — | — | 0.6 | |
| CEx. 2 | $Mg_{0.7}Al_{0.3}(OH)_2(CO_3)_{0.15} \cdot 0.57H_2O$ | 7 | 0.3 | 0.2 | |
| CEx. 3 | $Mg_{0.7}Al_{0.3}(OH)_2(CO_3)_{0.15} \cdot 0.43H_2O$ | 82 | 12 | 0.3 | |
| Ex. 5 | $Mg_{0.7}Al_{0.3}(OH)_{2.3} \cdot 0.7H_2O$ | 18 | 0.2 | 0.1 | |
| Ex. 6 | $Mg_{0.66}Al_{0.34}(OH)_{2.34} \cdot 0.6H_2O$ | 26 | 0.1 | 0.5 | |

| Example (Ex.) or Comparative Example (CEx.) | Polymer Type | Halogen content (ppm) | Resistance to corroding tendency (Class) | Yellowing resistance (b) | Appearance of molded articles |
|---|---|---|---|---|---|
| Ex. 1 | Polypropylene | 300 | 2 | 0.90 | Very good |
| Ex. 2 | " | 300 | 3 | 1.0 | Good |
| Ex. 3 | " | 300 | 3 | 0.92 | Good |
| Ex. 4 | " | 300 | 2 | 0.90 | Very good |
| CEx. 1 | " | 300 | 7 | 3.85 | Good |
| CEx. 2 | " | 300 | 4 | 1.20 | Good |
| CEx. 3 | " | 300 | 5 | 2.45 | Poor; many fish eyes occurred |
| Ex. 5 | High-density polyethylene | 100 | 2 | 0.90 | Very good |
| Ex. 6 | Polyisoprene | 800 | 2 | 1.0 | — |

What we claim is:

1. A polyolefin composition consisting essentially of
   (a) 100 parts by weight of a polyolefin containing halogens derived from a polymerization catalyst and/or attributed to the after-halogenation of the polymer, and
   (b) about 0.001 to about 10 parts by weight of an aluminum-magnesium hydroxide represented by the following formula $$Mg_{1-x}Al_x(OH)_{2+x} \cdot mH_2O \qquad (1)$$

wherein x is a positive number represented by $0 < x \leq 0.5$ and m is a positive number represented by $0 \leq m < 2$, and having a BET specific surface area of no more than about 40 m²/g.

2. The composition of claim 1 wherein the aluminum-magnesium hydroxide is surface-treated with about 1 to about 10 parts by weight, per 100 parts by weight of the hydroxide, of an alkali metal salt of a higher fatty acid.

3. The composition of claim 1 wherein the aluminum-magnesium hydroxide has an average second-order particle diameter of not more than about 5 microns.

4. The composition of claim 2 wherein the alkali metal salt of a higher fatty acid is an alkali metal salt of stearic acid or oleic acid.

5. The composition of claim 1 wherein said polyolefin is a member selected from the group consisting of polymers or copolymers of $C_2$–$C_8$ olefins, copolymers of at least one $C_2$–$C_8$ olefin with a diene, polymers or copolymers of $C_4$–$C_8$ dienes, and the after-halogenated products of said polymers or copolymers.

6. A method for inactivating the halogen in a halogen-containing polyolefin, which comprises mixing 100 parts by weight of a polyolefin containing halogens derived from a polymerization catalyst and/or attributed to after-halogenation of the polymer with about 0.001 to about 10 parts by weight of an aluminum-magnesium hydroxide of the following formula $$Mg_{1-x}Al_x(OH)_{2+x} \cdot mH_2O \qquad (1)$$

wherein x is a positive number represented by $0 < x \leq 0.5$ and m is a positive number represented by $0 \leq m < 2$, said aluminum-magnesium hydroxide having a BET specific surface area of not more than about 40 m²/g.

* * * * *

UNITED STATES PATENT AND TRADEMARK OFFICE
CERTIFICATE OF CORRECTION

PATENT NO. : 4,379,882
DATED : April 12, 1983
INVENTOR(S) : Shigeo MIYATA

It is certified that error appears in the above—identified patent and that said Letters Patent is hereby corrected as shown below:

Column 3, line 44, change "0<x23 0.5" to $--0<x\leq 0.5--$.

Signed and Sealed this

Sixth Day of December 1983

[SEAL]

Attest:

Attesting Officer

GERALD J. MOSSINGHOFF

Commissioner of Patents and Trademarks